(12) United States Patent
Arce et al.

(10) Patent No.: US 11,028,823 B2
(45) Date of Patent: Jun. 8, 2021

(54) WIND TURBINE BLADE WITH TIP END SERRATIONS

(71) Applicant: LM WIND POWER US TECHNOLOGY APS, Kolding (DK)

(72) Inventors: Carlos Arce, Kolding (DK); Jesper Madsen, Gesten (DK); Jordy Hertel Nilsson Van Kalken, Lunderskov (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 215 days.

(21) Appl. No.: 16/311,505

(22) PCT Filed: Jun. 20, 2017

(86) PCT No.: PCT/EP2017/065113
§ 371 (c)(1),
(2) Date: Dec. 19, 2018

(87) PCT Pub. No.: WO2017/220594
PCT Pub. Date: Dec. 28, 2017

(65) Prior Publication Data
US 2019/0234373 A1     Aug. 1, 2019

(30) Foreign Application Priority Data
Jun. 20, 2016   (EP) ................................ 16175186

(51) Int. Cl.
*F03D 1/06*    (2006.01)

(52) U.S. Cl.
CPC ......... *F03D 1/0633* (2013.01); *F03D 1/0675* (2013.01); *F05B 2230/80* (2013.01);
(Continued)

(58) Field of Classification Search
CPC ...... F03D 1/0633; F03D 1/0675; Y02P 70/50; F05B 2230/80; F05B 2240/301; F05B 2250/183; F05B 2260/96; Y02E 10/72
See application file for complete search history.

(56) References Cited

U.S. PATENT DOCUMENTS 5,533,865 A  *  7/1996  Dassen ................. F03D 1/0608
                                                    416/228
8,414,261 B2 *  4/2013  Bonnet ................. F03D 1/0641
                                                    416/1

(Continued)

FOREIGN PATENT DOCUMENTS

WO    2014/086564 A1    6/2014
WO    2014/086919 A1    6/2014

OTHER PUBLICATIONS

International Search Report dated Nov. 9, 2017 issued in corresponding International Application No. PCT/EP2017/065113.

*Primary Examiner* — David E Sosnowski
*Assistant Examiner* — Sabbir Hasan
(74) *Attorney, Agent, or Firm* — Nath, Goldberg & Meyer; Jerald L. Meyer; Tanya E. Harkins

(57) ABSTRACT

The present invention relates to a wind turbine blade (10) comprising two or more serrations (100*a*, 100*b*, 100*c*) provided along a section (S) of the trailing edge (20). The section (S) extends spanwise from the tip end (14) towards the root end (16) for up to 5% of the total blade length (L), The serration (100*a*) closest to the tip end has a height (H) and/or width (W) greater than the respective height (H) and/or width (W) of at least one other serration (100*b*, 100*c*) in said section. The present invention also relates to a wind turbine (2) comprising at least one wind turbine blade (10) of the present invention and to a serrated panel (66).

17 Claims, 4 Drawing Sheets

Figure 1:
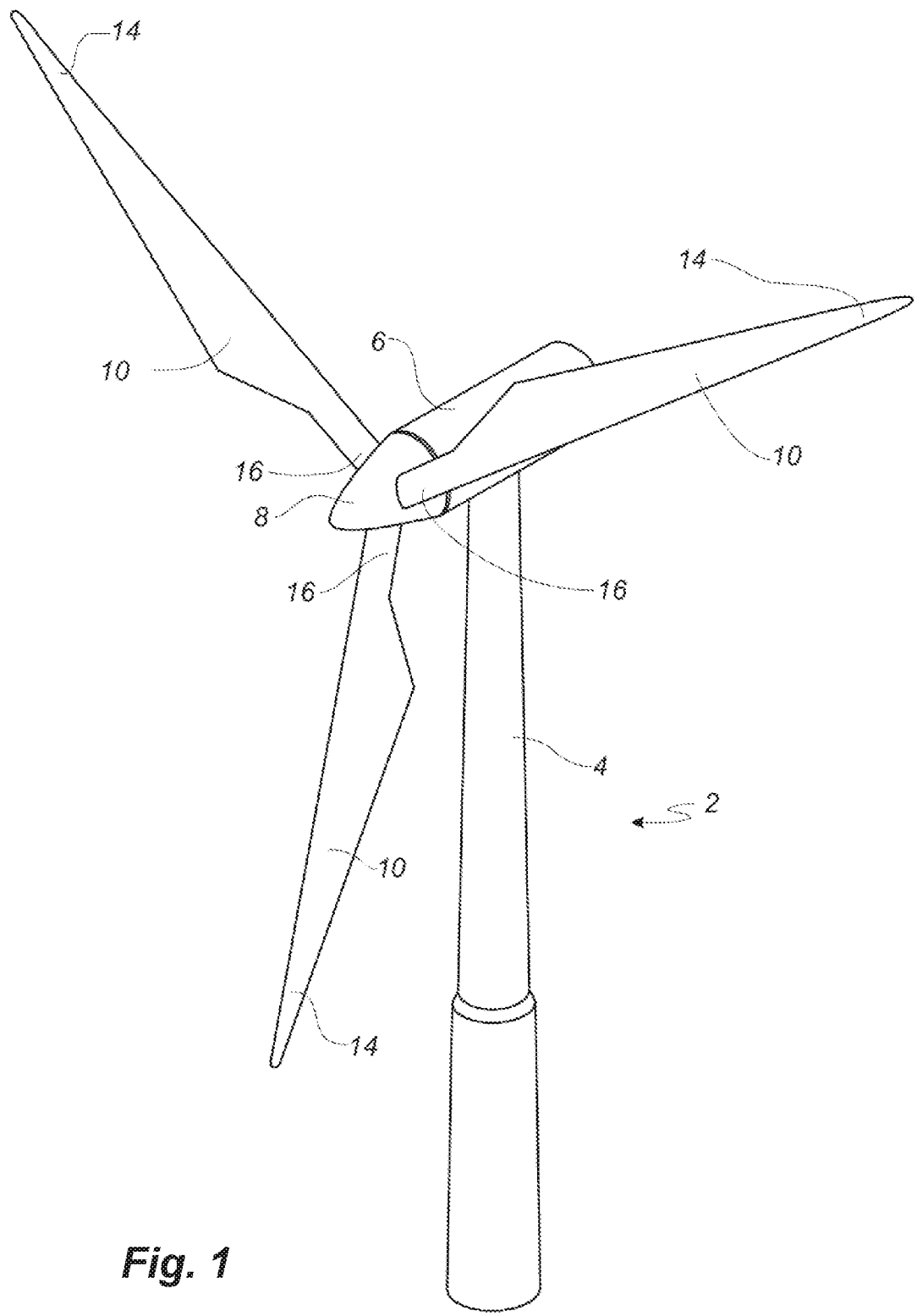

(52) U.S. Cl.
CPC ... *F05B 2240/301* (2013.01); *F05B 2250/183* (2013.01); *F05B 2260/96* (2013.01); *Y02E 10/72* (2013.01); *Y02P 70/50* (2015.11)

(56) References Cited

U.S. PATENT DOCUMENTS

| | | | |
|---|---|---|---|
| 9,841,002 B2 * | 12/2017 | Oerlemans | F03D 1/0608 |
| 2009/0074585 A1 | 3/2009 | Koegler et al. | |
| 2012/0027590 A1 | 2/2012 | Bonnet | |
| 2013/0149162 A1 | 6/2013 | Smith et al. | |

* cited by examiner

WIND TURBINE BLADE WITH TIP END SERRATIONS

This is a National Phase Application filed under 35 U.S.C. 371 as a national stage of PCT/EP2017/065113, filed Jun. 20, 2017, an application claiming the benefit of European Application No. 16175186.2, filed Jun. 20, 2016, the content of each of which is hereby incorporated by reference in its entirety.

FIELD OF THE INVENTION

The present invention relates to a wind turbine blade comprising two or more serrations provided along a section of the trailing edge. In other aspects, the present invention relates to a wind turbine comprising at least one wind turbine blade according to the present invention and to a serrated panel for a wind turbine blade.

BACKGROUND OF THE INVENTION

Wind power is becoming increasingly popular due to its clean and environmentally friendly production of energy. The rotor blades of modern wind turbines capture kinetic wind energy by using sophisticated blade design created to maximize efficiency. Turbine blades may today exceed 80 metres in length and 4 metres in width. The blades are typically made from a fibre-reinforced polymer material and comprise a pressure side shell half and a suction side shell half. The cross-sectional profile of a typical blade includes an airfoil for creating an air flow leading to a pressure difference between both sides. The resulting lift force generates torque for producing electricity.

Operational challenges typically include the creation of noise associated with the operation of wind power plants. Hence, sound emission reducing devices and associated blade designs are increasingly desired. To this end, modern wind turbine blades are sometimes provided with serrations along the blade trailing edges, in an effort to reduce blade trailing edge noise and/or to improve wind turbine blade efficiency.

In this context, US Patent Application No. 2009/0074585 A1 discloses a wind turbine blade provided with noise reducing features that are arranged on the surface of the wind turbine blade such that they form serrations. The serrations generally decrease in size in the spanwise direction from the root end to the tip end. Similar solutions are disclosed in WO 2014/086564 A1 and in WO 2014/086919 A1.

US 2012/027590 A1 discloses a wind turbine blade provided with noise reducers arranged in a modulated design and spaced from the blade tip. U.S. Pat. No. 5,533,865 discloses a similar design.

Also, the operation of wind turbines typically leads to the creation of blade tip vortices downstream of the rotor blade. Such vortices can be a major source of unsteadiness, aerodynamic noise and interaction. It is therefore desirable to reduce the strength of such vortices shed from the blade tip during operation. To this end, prior art approaches, in particular for aerospace applications, include the use of winglets or similar devices. However, the exact mechanism of tip vortex generation by a wind turbine blade tips and its attenuation is still not fully understood.

It is therefore an object of the invention to provide a wind turbine blade having an improved trailing edge configuration.

It is another object of the present invention to improve the efficiency of a wind turbine, such as a plurality of wind turbines in a wind farm.

It is another object of the present invention to improve the aerodynamics of a rotor blade in a simple and efficient manner.

SUMMARY OF THE INVENTION

In a first aspect, the present invention relates to a wind turbine blade having a profiled contour including a pressure side and a suction side, and a leading edge and a trailing edge with a chord having a chord length extending therebetween, the wind turbine blade extending in a spanwise direction between a root end and a tip end, the wind turbine blade comprising two or more serrations provided along a section of the trailing edge, said section extending spanwise from the tip end towards the root end for up to 5% of the total blade length, wherein the serration closest to the tip end has a height and/or width greater than the respective height and/or width of at least one other serration in said section.

The present inventors have found that the serrations as configured according to the present invention mitigate the intensity of the blade tip vortex. By designing serrations according to the present invention, the serration closest to the tip produces a large enough vortex that counteracts the rotation of the tip vortex. Thus, the energy of the tip vortex will be dissipated more rapidly. The effect is a reduction of the undesired impact of the tip vortex, such as by reducing its magnitude and/or by altering its location.

The serrations of the present invention may comprise a base proximal to the trailing edge of the blade and an apex distal to the trailing edge of the blade with a notional line extending from a midpoint of the base to the apex defining a height H of the serration. As used herein, the width of a serration refers to the width of its base. The apex is preferably a sharp apex such as an acute angle apex in that it represents an angled intersection of two straight lines or edges. In other embodiments, the apex may be rounded or otherwise smoothed.

In said section of the trailing edge, the serration closest to the tip end has a height and/or width greater than the respective height and/or width of at least one other serration in said section. This means that the serration closest to the tip end may have a height greater than the height of at least one other serration in said section, and/or that the serration closest to the tip end may have a width greater than the width of at least one other serration in said section. It is particularly preferred that the serration closest to the tip end has a surface area greater than the surface area of at least one other serration in said section, such as greater than the surface area of each of the other serrations in said section.

The serrations may have a substantially uniform thickness. The serrations may e.g. be formed of a panel attached to the blade or sandwiched between a pressure side shell part and a suction side shell part. Alternatively, the serrations may comprise a top and a bottom surface tapering towards each other at their respective apex ends.

The serrations may be triangular with an apex ratio of height H to width W of approximately 1:1 to 4:1 such as 2:1. The height H may be selected to represent 10% and 40% of the chord length of the blade at the midpoint of the serration. The height H of the serrations may be between 100 and 250 millimeters.

In some embodiments, said section of the trailing edge, which comprises two or more serrations, extends spanwise from the tip end towards the root end for up to 4%, such as for up to 3% or up to 2% of the total blade length, wherein the serration closest to the tip end has a height and/or width greater than the respective height and/or width of at least one other serration in said section.

The wind turbine blade of the present invention may comprise additional serrations or similar surface structures outside said trailing edge section extending spanwise from the tip end towards the root end for up to 5% of the total blade length. Such additional serrations may be of varying shapes and sizes as long as the afore-discussed requirements with respect to the serrations in said trailing edge section are met.

In a preferred embodiment, the serration closest to the tip end has a height and/or width greater than the respective height and/or width of at least two other serrations in said section. In some embodiments, said section comprises three or more serrations, wherein the serration closest to the tip end has a height and/or width, preferably both a height and width, greater than the respective height and/or width of at least two other serrations in said section. The serrations following the serration which is closest to the tip end—as seen in a spanwise direction towards the root end—may be of equal size or may gradually decrease in size.

According to one embodiment, the section comprises: a first serration closest to the tip and having a first height and first width, a second serration farther from the tip and having a second height and second width, and a third serration even farther from the tip end and having a third height and third width, wherein the first height is greater than the second height, and wherein the second height is greater than the third height. The first width may advantageously be greater than the second width, which in turn may be greater than the third width.

According to a preferred embodiment, the serration closest to the tip end has a height and/or width greater than the respective height and/or width of all other serrations in said section. Preferably, the height and/or width of the serrations in said section gradually increases towards the tip end. In some embodiments, the surface area of each serration increases by at least 5% per serration towards the tip end in said section.

According to another embodiment, the chord length of the blade increases from the tip end towards the root end throughout said section. Preferably, the chord length of the blade increases by at least 5%, such as at least 10% from the tip end to the opposing end of the section.

According to another embodiment, the blade comprises three or more serrations provided along said section, such as at least four or at least five serrations.

According to another embodiment, the spanwise distance between the tip end and the midpoint of the base of the serration closest to the tip end is between 5 and 500 millimeters, preferably between 10 and 400 millimeters, most preferably between 50 and 400 millimeters.

According to another embodiment, one or more of the serrations are arranged at incidence to the flow over the wind turbine blade, i.e. at an angle to the flow direction over the blade at the trailing edge of the blade. In one embodiment, said serrations are angled towards the pressure side of the wind turbine blade. In another embodiment, said serrations are angled towards the suction side of the wind turbine blade. Serrations arranged at incidence may result in the creation of a streamwise vortex pair. Preferably, said serrations are angled to the flow direction over the wind turbine blade at an angle of between 0-45 degrees to the chord line, preferably between 1-25 degrees, such as between 5-20 degrees.

According to another embodiment, one or more of the serrations are arranged at an angle to the chord line of between 1-45 degrees, preferably between 1-25 degrees. In some embodiments, one or more of the serrations may be angled towards the pressure side of the blade. In other embodiments, one or more of the serrations may be angled towards a suction side of the blade. In one embodiment, the serration closest to the tip end is arranged at an angle to the chord line of 5-45 degrees.

According to another embodiment, the serrations are arranged substantially coplanar with a trailing edge streamline.

According to another embodiment, the serrations are triangular with an apex ratio of height H to width W of approximately 0.5:1 to 4:1 such as from 1:1 to 3:1, or 1.5:1 to 2.5:1, such as 2:1. Serrations of such shape have been found to be particularly advantageous in terms of the aerodynamic effects achieved by the present invention. In a preferred embodiment, the height H of each serration corresponds to 10-40%, such as 15-35%, of the chord length of the blade at the midpoint of the base of the serration.

Preferably, the height H of the serrations is between 100 and 250 millimeters, such as between 120 and 200 millimeters. In some embodiments, the height H of the serration closest to the tip end is at least 150 millimeters, such as at least 200 millimeters or at least 250 millimeters.

According to another embodiment, the tip end further comprises a winglet or tip vane. Such embodiments may be useful in further improving the aerodynamics of operating a wind turbine according to the present invention.

In another aspect, the present invention relates to a wind turbine comprising at least one wind turbine blade according to the present invention. In a preferred embodiment, said wind turbine is part of a wind park comprising one or more further wind turbines according to the present invention.

In another aspect, the present invention relates to a serrated panel for a wind turbine blade, wherein the panel is arranged to be attached to the trailing edge of a blade to form a plurality of serrations at the trailing edge of the blade, wherein the panel comprises two or more serrations, wherein the serration closest to the tip end, when the panel is attached to the blade, has a height and/or width greater than the respective height and/or width of at least one other serration of said panel. Such panel may represent a simple and cost-efficient way to upgrade existing wind turbine blades using the technology of the present invention. The serrated panel is configured to be arranged such that the panel, when attached to the trailing edge of the blade, has the larger serration closest to the tip of the blade.

Preferably, the serration closest to the tip end, when the panel is attached to the blade, has a height and/or width greater than the respective height and/or width of at least two other serrations of said panel. According to a preferred embodiment, the serration closest to the tip end, when the panel is attached to the blade, has a height and/or width greater than the respective height and/or width of all other serrations of said panel. Preferably, the height and/or width of the serrations of the panel gradually increases towards the tip end, when the panel is attached to the blade.

DETAILED DESCRIPTION OF THE INVENTION

Figure 2:
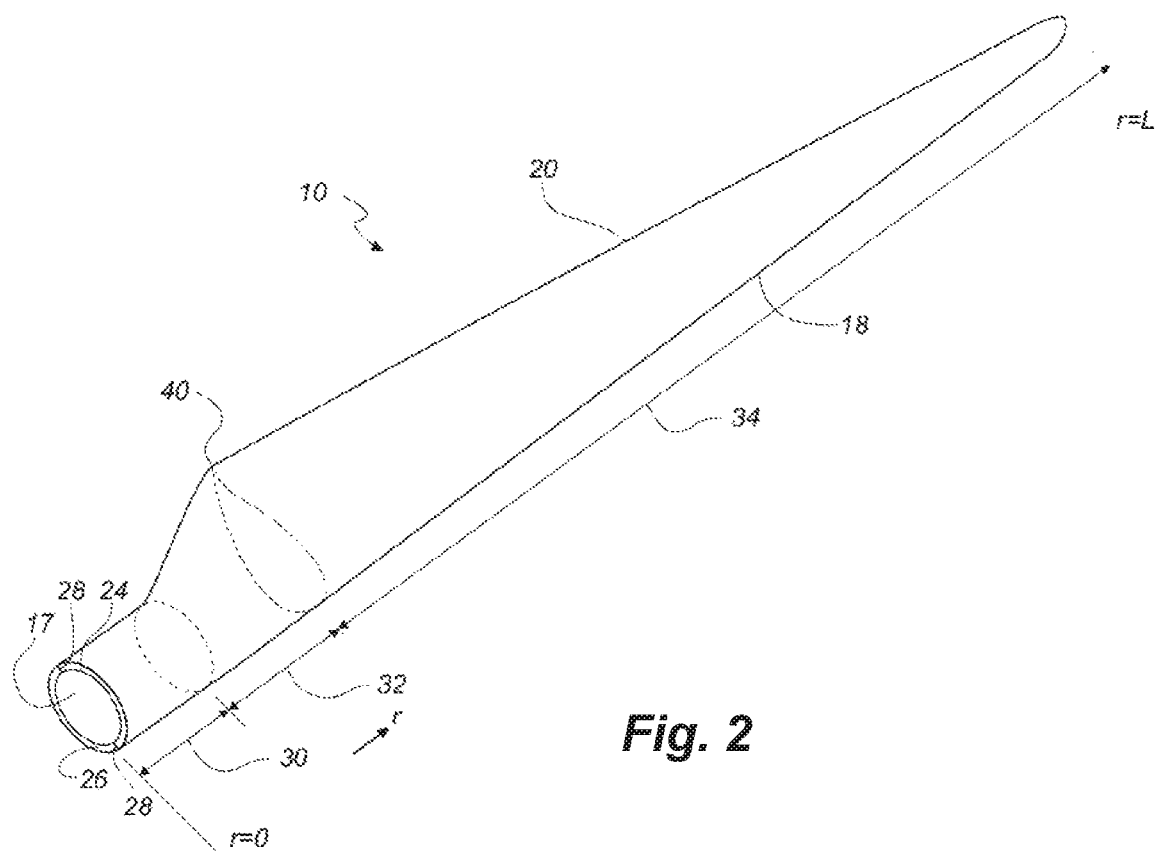
Figure 3:
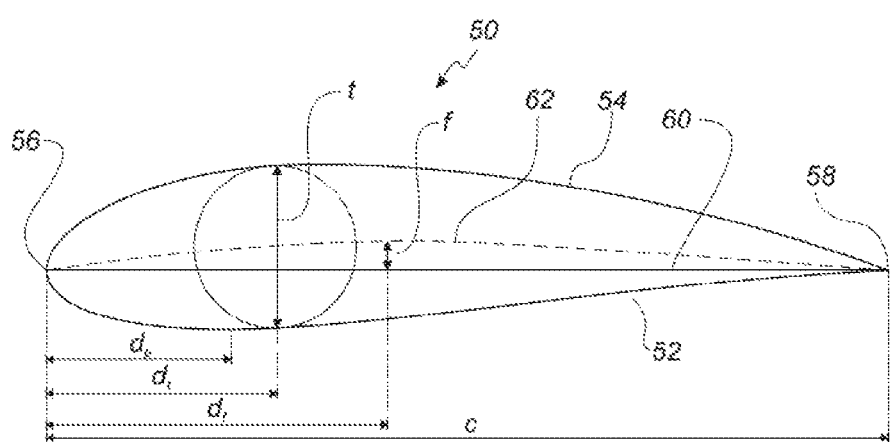
Figure 4:
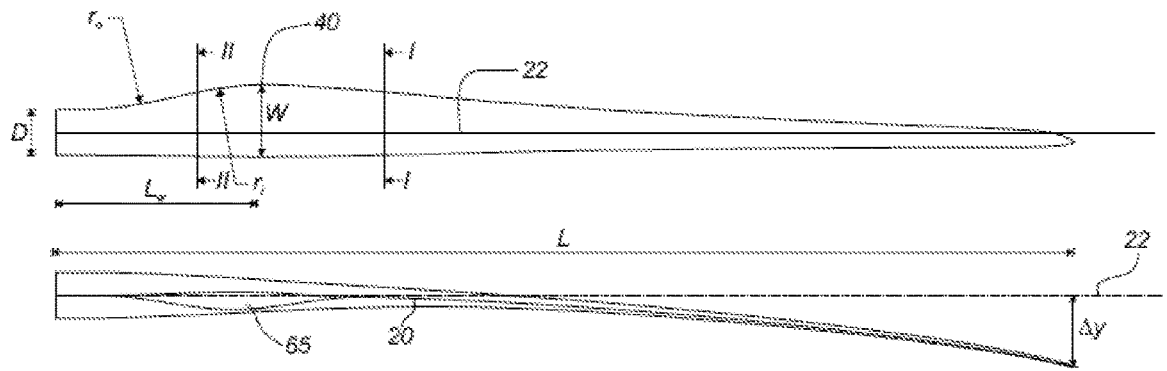
Figure 5:
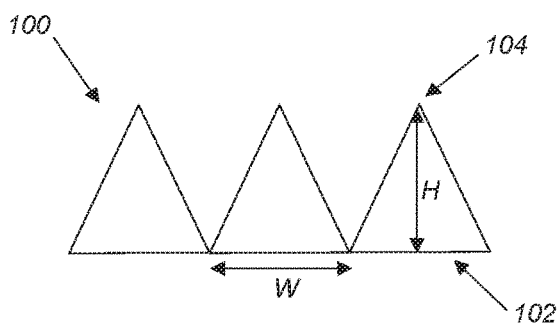
Figure 6:
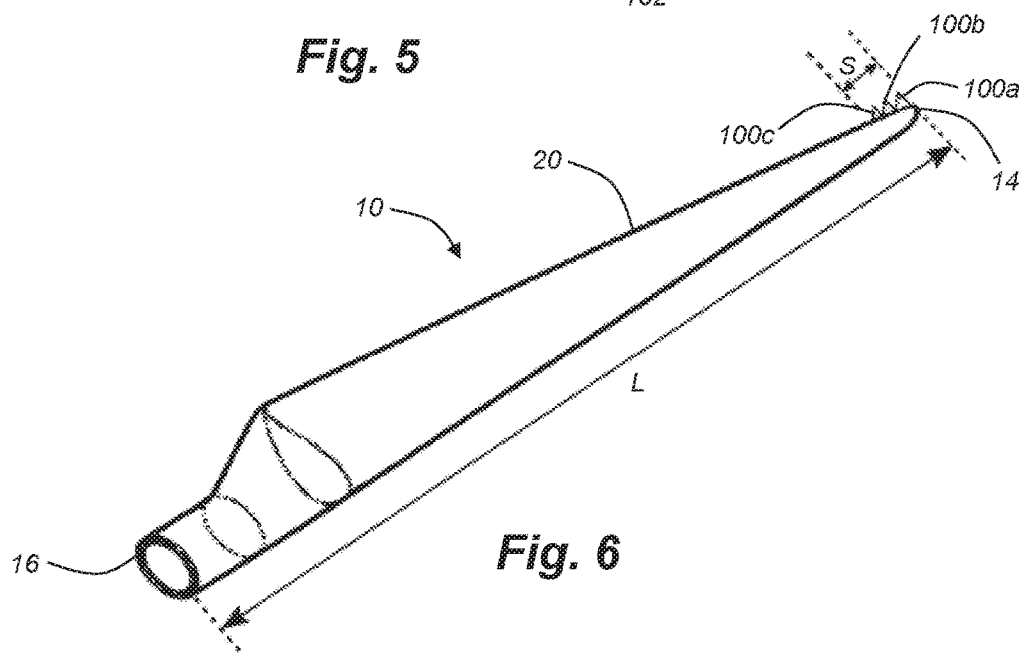
Figure 7:
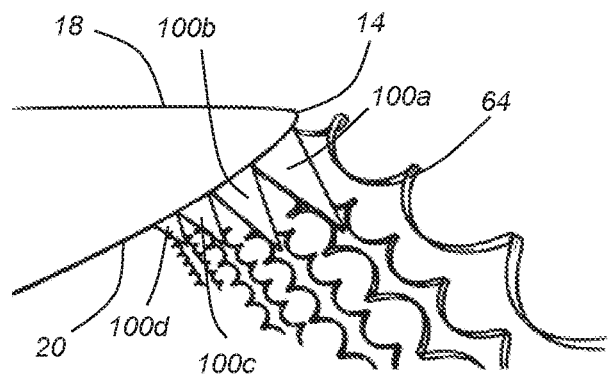
Figure 8:
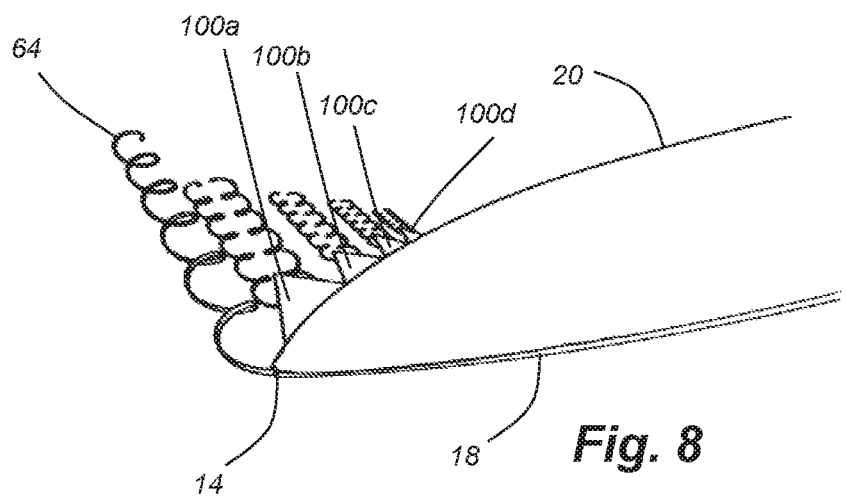
Figure 9:
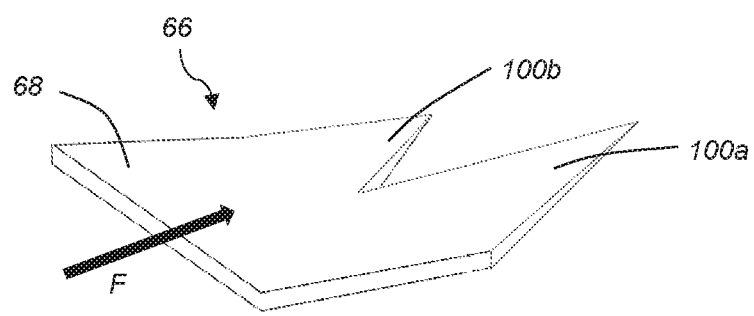

The invention is explained in detail below with reference to embodiments shown in the drawings, in which FIG. 1 shows a wind turbine, FIG. 2 shows a schematic view of a wind turbine blade, FIG. 3 shows a schematic view of an airfoil profile through section I-I of FIG. 4, FIG. 4 shows a schematic view of the wind turbine blade, seen from above and from the side, FIG. 5 illustrates a set of trailing edge serrations;

FIG. 6 shows a schematic view of a wind turbine blade according to the present invention, FIG. 7 is a top view of a tip end of a wind turbine blade according to the present invention, FIG. 8 is a side view of a tip end of a wind turbine blade according to the present invention, and FIG. 9 is a perspective view of a serrated panel according to the present invention.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIGS. 3 and 4 depict parameters which are used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 or chord line with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centers of these inscribed circles and the deviation or distance from the chord 60 is called the camber f, The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position r=$L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$ which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy which corresponds to the out of plane deflection from a pitch axis 22 of the blade.

With reference to FIG. 5, an enlarged view of a plurality of common serrations 100 are shown to illustrate some dimensions of the serrations. The serrations 100 comprise a base end 102 which is to be arranged at the trailing edge 20 of the wind turbine blade 10, and an apex 104 which extends downwind of the blade trailing edge 20. A notional line extending from a midpoint of the base 102 to the apex 104 defines a height H of the serration. Also, each serration has a width W of its base. The illustrated serrations are substantially planar, but it will be understood that the serrations may vary in depth or thickness, in particular having tapered or chamfered edges. The serrations 100 are shown as having a profile substantially corresponding to an isosceles triangle, but it will be understood that other serration shape profiles may be used, e.g. curved or wave-shaped profiles, crenelated edges, etc.

FIG. 6 is a schematic view of a wind turbine blade according to the present invention. The blade 10 comprises three serrations 100a, 100b, 100c provided along a section S of the trailing edge 20. The section S extends spanwise from the tip end 14 towards the root end for 5% of the total blade length L. The serration 100a, which is closest to the tip end, has a height and a width greater than the respective height and width of the two other serrations 100b, 100c in said section S. Also, the height and width of the serrations 100a, 100b, 100c in said section S gradually increases towards the tip end 14.

A similar embodiment is illustrated in FIGS. 7 and 8. Here, the blade comprises four serrations 100a, 100b, 100c, 100d along a section of the trailing edge 20. The serration 100a, which is closest to the tip end, has a height and a width greater than the respective height and width of the other serrations in said section. Again, the height and width of the serrations 100a, 100b, 100c, 100d in said section gradually increases towards the tip end 14. FIGS. 7 and 8 also illustrated the vortices 64 produced by the tip end 14 of the blade and by the serrations 100a, 100b, 100c, 100d.

In the embodiment illustrated in FIG. 9, the serrations 100a, 100b are provided as part of a serrated panel 66 for attachment to the trailing edge of a wind turbine blade. The panel 66 comprises a panel base section 68 for attachment to the blade, with the serrations 100a, 100b arranged at an angle to the panel base section 68 such that the serrations 100a, 100b are arranged at incidence to the air flow over the wind turbine blade. The direction of air flow over the wind turbine blade is generally indicated by the arrow F. As seen in FIG. 9, the serration 100a closest to the tip end, when the panel is attached to the blade, has a height greater than the height the other serration 100b of the panel 66.

The invention is not limited to the embodiments described herein, and may be modified or adapted without departing from the scope of the present invention.

LIST OF REFERENCE NUMERALS 2 wind turbine
4 tower
6 nacelle
8 hub
10 blade
blade tip
16 blade root
18 leading edge
20 trailing edge
22 pitch axis
30 root region
32 transition region
34 airfoil region
40 shoulder/position of maximum chord
50 airfoil profile
52 pressure side
54 suction side
56 leading edge
58 trailing edge
60 chord
62 camber line/median line
64 vortex
66 serrated panel
68 panel base section
100 serration
102 serration base
104 serration apex
c chord length
$d_t$ position of maximum thickness
$d_f$ position of maximum camber
$d_p$ position of maximum pressure side camber
f camber
L blade length
r local radius, radial distance from blade root
t thickness
$\Delta y$ prebend
H serration height
W serration width
S section of trailing edge

The invention claimed is:

1. A wind turbine blade having a profiled contour including a pressure side and a suction side, and a leading edge and a trailing edge with a chord having a chord length extending therebetween, the wind turbine blade extending in a spanwise direction between a root end and a tip end, the wind turbine blade comprising two or more serrations provided along a section of the trailing edge, said section extending spanwise from the tip end towards the root end for up to 5% of the total blade length, wherein a closest one of the two or more serrations to the tip end has a height and/or width greater than the respective height and/or width of at least one of a remainder of the two or more serrations in said section.

2. The wind turbine blade according to claim 1, wherein the two or more serrations comprise at least three serrations, and wherein the height and/or the width of the closest one of the two or more serrations to the tip end is greater than the respective height and/or the width of at least two serrations of the remainder in said section.

3. The wind turbine blade according to claim 1, wherein the height and/or the width of the closest one of the two or more serrations to the tip end is greater than the respective height and/or the width of each of the serrations of the remainder in said section.

4. The wind turbine blade according to claim 1, wherein the two or more serrations comprise:
a first serration comprising the closest one of the two or more serrations to the tip end, wherein the first serration has a first height and first width;
a second serration having a second height and second width; and
a third serration, wherein the third serration is positioned furthest away from the tip end, the third serration having a third height and third width, wherein the second serration is positioned between the first serration and the third serration,
wherein the first height is greater than the second height, and
wherein the second height is greater than the third height.

5. The wind turbine blade according to claim 1, wherein the height and/or the width of each of the serrations of the two or more serrations in said section gradually increases towards the tip end.

6. The wind turbine blade according to claim 1, wherein the chord length of the blade increases from the tip end towards the root end throughout said section.

7. The wind turbine blade according to claim 1, wherein the two or more serrations comprise three or more serrations along said section.

8. The wind turbine blade according to claim 1, wherein one or more of the serrations of the two or more serrations are arranged at incidence to a flow over the wind turbine blade.

9. The wind turbine blade according to claim 1, wherein one or more of the serrations of the two or more serrations are arranged at an angle to a chord line of between 1-45 degrees.

10. The wind turbine blade according to claim 9, wherein the one or more serrations of the two or more serrations are arranged at an angle to the chord line of between 1-25 degrees.

11. The wind turbine blade according to claim 1, wherein the closest one of the two or more serrations to the tip end is arranged at an angle to a chord line of 5-45 degrees.

12. The wind turbine blade according to claim 1, wherein each of the serrations of the two or more serrations are arranged coplanar with a trailing edge streamline.

13. The wind turbine blade according to claim 1, wherein the height of each of the serrations of the two or more serrations corresponds to 10-40% of the chord length of the wind turbine blade at a midpoint of a base of the respective two of more serrations.

14. The wind turbine blade according to claim 1, wherein the height of each of the serrations of the two or more serrations is between 100 and 250 millimeters.

15. The wind turbine blade according to claim 14, wherein the height of the closest one of the two or more serrations to the tip end is at least 150 millimeters.

16. The wind turbine blade according to claim 1, wherein the tip end further comprises a winglet or tip vane.

17. A wind turbine comprising at least one wind turbine blade as claimed in claim 1.

* * * * *